United States Patent
Katayama

(10) Patent No.: US 11,063,273 B2
(45) Date of Patent: Jul. 13, 2021

(54) FUEL CELL SYSTEM

(71) Applicant: TOYOTA JIDOSHA KABUSHIKI KAISHA, Toyota (JP)

(72) Inventor: Yusuke Katayama, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 131 days.

(21) Appl. No.: 16/284,027

(22) Filed: Feb. 25, 2019

(65) Prior Publication Data
US 2019/0280314 A1 Sep. 12, 2019

(30) Foreign Application Priority Data

Mar. 7, 2018 (JP) .............................. JP2018-040852

(51) Int. Cl.
*H01M 8/04089* (2016.01)
*H01M 8/04746* (2016.01)
*H01M 8/04537* (2016.01)

(52) U.S. Cl.
CPC ... *H01M 8/04089* (2013.01); *H01M 8/04604* (2013.01); *H01M 8/04753* (2013.01); *H01M 8/04776* (2013.01); *H01M 2250/20* (2013.01); *Y02E 60/50* (2013.01)

(58) Field of Classification Search
CPC ......... H01M 2250/20; H01M 8/04089; H01M 8/04604; H01M 8/04626; H01M 8/04753; H01M 8/04776; Y02E 60/50
See application file for complete search history.

(56) References Cited

U.S. PATENT DOCUMENTS

| 2007/0092771 A1* | 4/2007 | Wake ................ | H01M 8/04302 |
| | | | 429/414 |
| 2010/0159342 A1 | 6/2010 | Imanishi et al. | |
| 2015/0171444 A1* | 6/2015 | Tanaka .............. | H01M 8/04753 |
| | | | 429/446 |
| 2016/0126566 A1* | 5/2016 | Iio ..................... | H01M 8/04753 |
| | | | 429/444 |

FOREIGN PATENT DOCUMENTS

| JP | 2009-016117 A | 1/2009 |
| JP | 2009-026632 A | 2/2009 |

* cited by examiner

*Primary Examiner* — Lingwen R Zeng
(74) *Attorney, Agent, or Firm* — Dickinson Wright, PLLC

(57) ABSTRACT

A fuel cell system includes: a fuel cell; a compressor; a supply adjusting valve adjusting an amount of air to be supplied; a bypass valve adjusting a flow rate of the air passing through the bypass flow passage; a flow rate measuring unit measuring a flow rate of the air; a pressure measuring unit measuring a pressure of the air; an opening control unit outputting an opening control signal for controlling degrees of opening of the supply adjusting valve and the bypass valve; a rotation speed control unit outputting a rotation speed control signal for controlling a rotation speed of the compressor; and a determination unit determining that the bypass valve is stuck open when the flow rate is less than a flow rate threshold value, and determines that pipe disconnection has occurred when the flow rate is equal to or greater than the flow rate threshold value.

6 Claims, 5 Drawing Sheets

FUEL CELL SYSTEM

INCORPORATION BY REFERENCE

The disclosure of Japanese Patent Application No. 2018-040852 filed on Mar. 7, 2018 including the specification, drawings and abstract is incorporated herein by reference in its entirety.

BACKGROUND

1. Technical Field

The disclosure relates to a fuel cell system.

2. Description of Related Art

A fuel cell system including a supply flow passage that supplies air from a compressor to a fuel cell, a discharge flow passage that discharges air discharged from the fuel cell to the atmosphere, and a bypass flow passage that supplies some of air flowing in the supply flow passage to the discharge flow passage to bypass the fuel cell is known. A bypass valve that adjusts a flow rate may be provided in the bypass flow passage. Japanese Unexamined Patent Application Publication No. 2009-016117 (JP 2009-016117 A) discloses a fuel cell system that detects an abnormality of a bypass valve based on an estimated pressure value of an oxidizing gas in a supply flow passage.

SUMMARY

In such a fuel cell system, when an oxidizing gas is supplied from the compressor in a state in which a control signal for closing an adjustment valve that is disposed in the supply flow passage which is downstream from a part connected to the bypass flow passage and adjusts a flow rate of an oxidizing gas to the fuel cell and closing the bypass valve is output, the reasons why a pressure in the supply flow passage does not increase when the adjustment valve is normally closed are considered to be that the bypass valve is stuck in an open state and that gas leaks due to pipe disconnection in a pipe constituting the supply flow passage and the bypass flow passage. In such a fuel cell system, there are demands for separately identifying such reasons.

According to a first aspect of the disclosure, there is provided a fuel cell system including: a fuel cell that generates electric power using air; a compressor that compresses the air and supplies the compressed air to the fuel cell; a supply flow passage that is connected to the fuel cell and the compressor and in which the air compressed by the compressor and flows towards the fuel cell; a discharge flow passage of which one end is connected to the fuel cell and in which the air discharged from the fuel cell flows towards an atmosphere; a bypass flow passage that branches from the supply flow passage and is connected to the discharge flow passage and in which the air flowing from a part connected to the discharge flow passage to a downstream flow passage which is downstream in the discharge flow passage flows; a supply adjusting valve that is disposed at at least one position of a first position downstream from a first part connected to the bypass flow passage in the supply flow passage and a second position upstream from a second part connected to the bypass flow passage in the discharge flow passage and adjusts an amount of air to be supplied to the fuel cell; a bypass valve that is disposed in the bypass flow passage and adjusts a flow rate of the air passing through the bypass flow passage; a flow rate measuring unit that measures a flow rate of the air to be supplied from the compressor; a pressure measuring unit that is disposed (a) upstream from a third position at which the bypass valve is disposed in the bypass flow passage or (b) in the supply flow passage and measures a pressure of the air compressed by the compressor; an opening control unit configured to output an opening control signal for controlling degrees of opening of the supply adjusting valve and the bypass valve; a rotation speed control unit configured to output a rotation speed control signal for controlling a rotation speed of the compressor; a generated electric power calculating unit configured to calculate an amount of electric power generated by the fuel cell; and a determination unit configured to determine whether there is an abnormality in the fuel cell system. The determination unit is configured (a) to determine that the bypass valve is stuck open when the measured flow rate is less than a preset flow rate threshold value, and (b) to determine that pipe disconnection has occurred in a pipe constituting the supply flow passage and the bypass flow passage when the measured flow rate is equal to or greater than the flow rate threshold value, when (I) the determination unit (i) to causes the opening control unit to output the opening control signal for switching the bypass valve to a closed state and controlling the supply adjusting valve such that the amount of generated electric power reaches a preset amount of generated electric power, and (ii) to causes the rotation speed control unit to output the rotation speed control signal such that the compressor rotates at a preset rotation speed, and (II) the calculated amount of generated electric power is less than a generated electric power threshold value which is set to be less than the preset amount of generated electric power and the measured pressure is less than a preset pressure threshold value. According to this aspect, it is possible to separately identify sticking of the bypass valve in an open state and pipe disconnection in the pipe constituting the supply flow passage and the bypass flow passage. Accordingly, it is possible to take appropriate measures depending on the abnormalities.

(2) According to a second aspect of the disclosure, there is provided a fuel cell system including: a fuel cell that generates electric power using air; a compressor that compresses the air and supplies the compressed air to the fuel cell; a rotation speed sensor that detects a rotation speed of the compressor; a supply flow passage that is connected to the fuel cell and the compressor and in which the air compressed by the compressor flows towards the fuel cell; a discharge flow passage of which one end is connected to the fuel cell and in which the air discharged from the fuel cell and flows towards an atmosphere; a bypass flow passage that branches from the supply flow passage and is connected to the discharge flow passage and supplies the air from a part connected to the discharge flow passage to a downstream flow passage which is downstream in the discharge flow passage; a supply adjusting valve that is disposed at at least one position of a first position downstream from a first part connected to the bypass flow passage in the supply flow passage and a second position upstream from a second part connected to the bypass flow passage in the discharge flow passage and adjusts an amount of air to be supplied to the fuel cell; a bypass valve that is disposed in the bypass flow passage and adjusts a flow rate of the air passing through the bypass flow passage; a flow rate measuring unit that measures a flow rate of the air to be supplied from the compressor; a pressure measuring unit that is disposed (a) upstream from a third position at which the bypass valve is disposed in the bypass flow passage or (b) in the supply flow passage and measures a pressure of the air compressed by the compressor; an opening control unit configured to output an opening control signal for controlling degrees of opening of the supply adjusting valve and the bypass valve; a rotation speed control unit configured to output a rotation speed control signal for controlling the rotation speed of the compressor; a generated electric power calculating unit configured to calculate an amount of electric power generated by the fuel cell; and a determination unit configured to determine whether there is an abnormality in the fuel cell system. The determination unit is configured (a) to determine that the bypass valve is stuck open when the measured flow rate is less than a preset flow rate threshold value, (b) to determine whether there is an abnormality in the compressor when the measured flow rate is equal to or greater than the flow rate threshold value, (c) to determine that there is the abnormality in the compressor when a difference between the detected rotation speed and the rotation speed corresponding to the rotation speed control signal is equal to or greater than a preset rotation speed threshold value in determining whether there is the abnormality in the fuel cell system, and (d) to determine that pipe disconnection has occurred in a pipe constituting the supply flow passage and the bypass flow passage when the difference between the detected rotation speed and the rotation speed corresponding to the rotation speed control signal is less than the preset rotation speed threshold value in determining whether there is the abnormality in the fuel cell system when (I) the determination unit (i) causes the opening control unit to output the opening control signal for switching the bypass valve to a closed state and controlling the supply adjusting valve such that the amount of generated electric power reaches a preset amount of generated electric power, (ii) causes the rotation speed control unit to output the rotation speed control signal such that the compressor rotates at a preset rotation speed, and (II) the calculated amount of generated electric power is less than a generated electric power threshold value which is set to be less than the preset amount of generated electric power and the measured pressure is less than a preset pressure threshold value. According to this aspect, it is possible to separately identify sticking of the bypass valve in an open state, pipe disconnection in the pipe constituting the supply flow passage and the bypass flow passage, and an abnormality in the compressor. Accordingly, it is possible to take appropriate measures depending on the abnormalities.

(3) The determination unit may be configured to determine that the supply adjusting valve is stuck closed when the calculated amount of generated electric power is less than the generated electric power threshold value which is set to be less than the preset amount of generated electric power and the measured pressure is equal to or greater than the pressure threshold value. According to this configuration, it is possible to identify sticking of the supply adjusting valve in a closed state.

(4) The fuel cell system may further include a threshold value correcting unit configured to learn the flow rate measured by the flow rate measuring unit which varies depending on the opening control signal while the fuel cell system is operating and to correct the flow rate threshold value based on a result of learning of the measured flow rate. According to this configuration, even when a pressure loss in a flow passage through which air flows has changed due to replacement or repair of a component of the fuel cell system, it is possible to correct the flow rate threshold value in response to the change. Accordingly, it is possible to maintain accuracy for separately identifying abnormalities of the fuel cell system.

The aspects of the disclosure can be applied to various forms such as a fuel cell system which is mounted in a vehicle, a ship, or the like using electric power as a power source, the vehicle itself, and the ship itself. The aspects of the disclosure may be embodied as an aspect of a computer program for implementing the aspects or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

A1. Device Configuration

Figure 1:
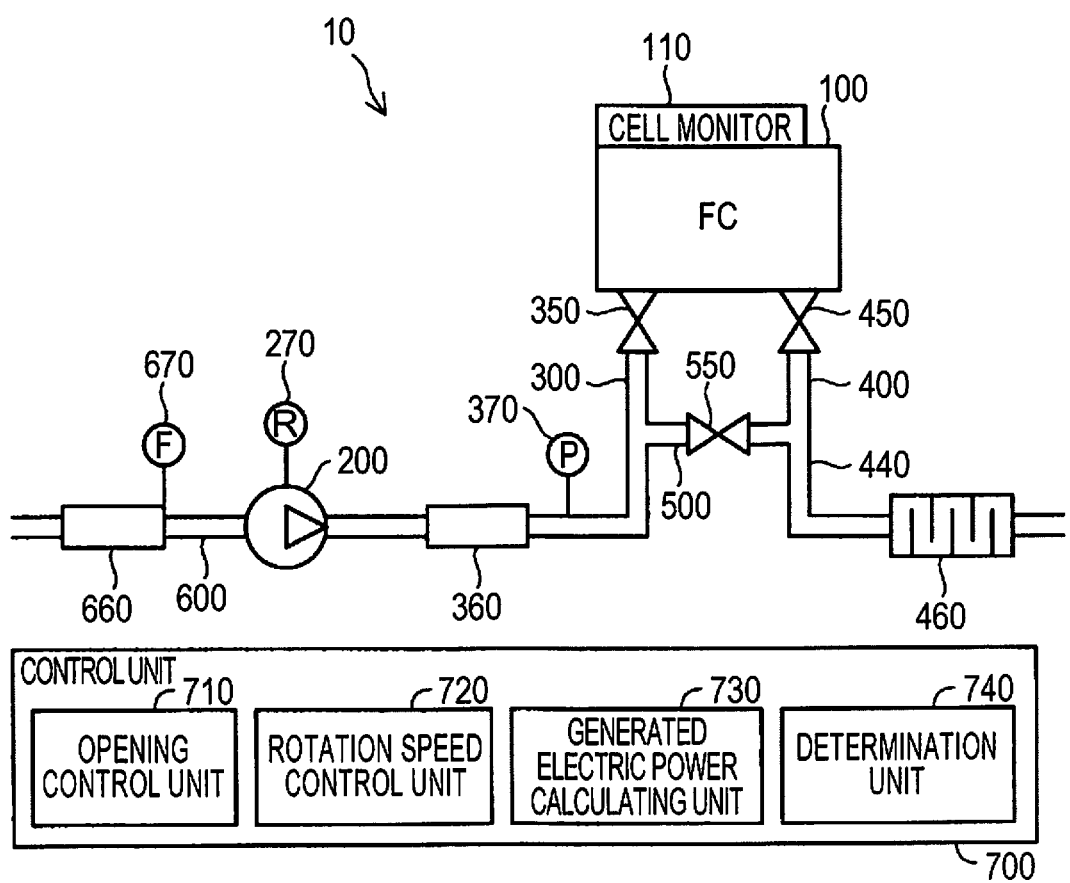
FIG. 1 is a diagram illustrating a configuration of a fuel cell system according to a first embodiment.

FIG. 1 is a diagram illustrating a configuration of a fuel cell system 10 according to a first embodiment of the disclosure. The fuel cell system 10 is mounted as a power source of a vehicle which is driven by a motor. The fuel cell system 10 includes a fuel cell 100, a cell monitor 110, a compressor 200, a supply flow passage 300, a discharge flow passage 400, a bypass flow passage 500, an intake flow passage 600, and a control unit 700.

The fuel cell 100 has a stacked structure in which a plurality of single cells is stacked. Each single cell has a configuration in which a membrane-electrode assembly in which an anode and a cathode are bonded to both surfaces of an electrolyte membrane having proton conductivity is interposed between separators. The fuel cell 100 is supplied with a hydrogen gas and an oxidizing gas and generates electric power by an electrochemical reaction between hydrogen and oxygen. In this embodiment, the oxidizing gas is air. The cell monitor 110 is a monitor that detects a voltage or a current of a cell constituting the fuel cell 100.

The compressor 200 compresses air taken in from the atmosphere and supplies the compressed air to the fuel cell 100. In this embodiment, the compressor 200 is an air compressor that supplies air. The compressor 200 includes a rotation speed sensor 270 that detects a rotation speed of the compressor 200.

The supply flow passage 300 connects the compressor 200 to the fuel cell 100. The supply flow passage 300 is a flow passage that supplies air, which has been compressed and supplied by the compressor 200, to the fuel cell 100. The discharge flow passage 400 is a flow passage of which one end is connected to the fuel cell 100 and that discharges air discharged from the fuel cell 100 to the atmosphere. The bypass flow passage 500 is a flow passage that branches from the supply flow passage 300 and is connected to the discharge flow passage 400. The intake flow passage 600 is a flow passage that introduces air into the compressor 200 from the atmosphere.

A first valve 350, an intercooler 360, and a pressure sensor 370 are provided in the supply flow passage 300. The first valve 350 is provided downstream from a part of the supply flow passage 300 connected to the bypass flow passage 500. The first valve 350 adjusts an amount of air to be supplied to the fuel cell 100. The intercooler 360 cools the air compressed by the compressor 200. The pressure sensor 370 measures a pressure of the air compressed by the compressor 200.

A second valve 450 and a muffler 460 are provided in the discharge flow passage 400. The second valve 450 is provided upstream from a part of the discharge flow passage 400 connected to the bypass flow passage 500. The second valve 450 adjusts an amount of air discharged from the fuel cell 100. The muffler 460 is provided downstream from a part of the discharge flow passage 400 connected to the bypass flow passage 500. The muffler 460 reduces exhaust sound which is generated at the time of discharging air to the atmosphere.

In this embodiment, an amount of air to be supplied to the fuel cell 100 is adjusted by the first valve 350 and the second valve 450. Accordingly, the first valve 350 and the second valve 450 can be considered as a subordinate concept of the supply adjusting valve described in the SUMMARY. In this embodiment, the first valve 350 and the second valve 450 are configured as valves which are adjustable in an arbitrary opening range. The first valve 350 and the second valve 450 are not limited to the valves which are adjustable in an arbitrary opening range and may be ON-OFF valves.

A third valve 550 is provided in the bypass flow passage 500. The third valve 550 adjusts a flow rate of air passing through the bypass flow passage 500. When the third valve 550 is open, the bypass flow passage 500 supplies air from a part connected to the discharge flow passage 400 to a downstream flow passage 440 which is downstream in the discharge flow passage 400. In this embodiment, the third valve 550 is configured as an ON-OFF valve. The third valve 550 is not limited to the ON-OFF valve and may be a valve which is adjustable in an arbitrary opening range. In this embodiment, the supply flow passage 300 and the bypass flow passage 500 are configured by connecting a plurality of pipes.

An air cleaner 660 and an air flowmeter 670 are provided in the intake flow passage 600. The air cleaner 660 removes dust in the air which is introduced into the compressor 200. The air flowmeter 670 measures a flow rate of air to be supplied from the compressor 200.

The control unit 700 receives signals output from various sensors provided in the fuel cell system 10 and controls the fuel cell system 10 as a whole. The control unit 700 includes an opening control unit 710, a rotation speed control unit 720, a generated electric power calculating unit 730, and a determination unit 740. The opening control unit 710 outputs opening control signals for controlling degrees of opening of the first valve 350, the second valve 450, and the third valve 550 to the first valve 350, the second valve 450, and the third valve 550. The rotation speed control unit 720 outputs a rotation speed control signal for controlling the rotation speed of the compressor 200 to the compressor 200. The generated electric power calculating unit 730 calculates an amount of electric power generated by the fuel cell 100 based on a signal supplied from the cell monitor 110.

The determination unit 740 determines whether an abnormality has occurred in the fuel cell system 10. Specifically, the determination unit 740 determines a position at which an abnormality has occurred in the fuel cell system 10 on the basis of values measured by the pressure sensor 370 and the air flowmeter 670 by performing an abnormality identifying process which will be described later.

A2. Abnormality Identifying Process

Figure 2:
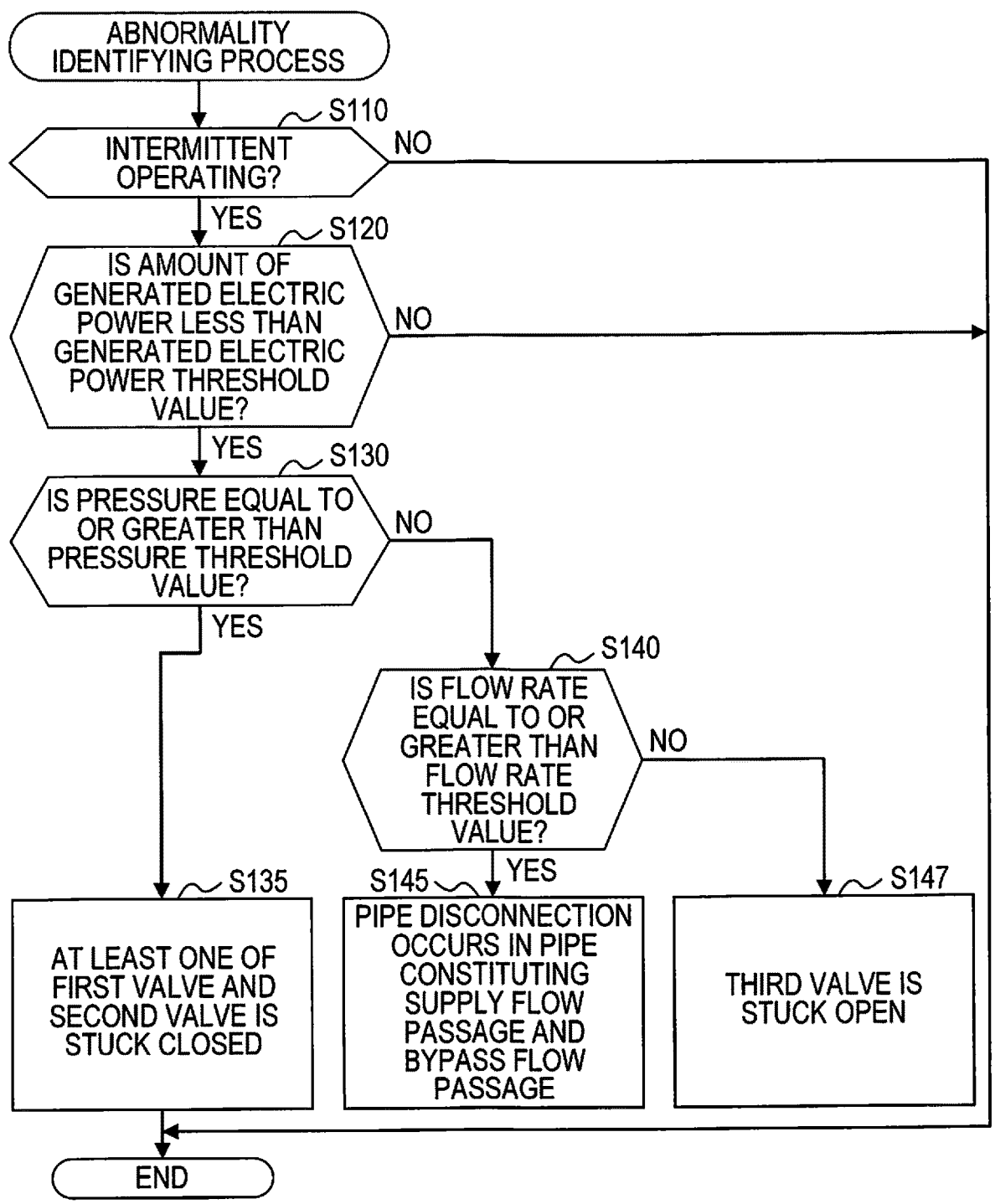
FIG. 2 is a flowchart illustrating an abnormality identifying process.

FIG. 2 is a flowchart illustrating an abnormality identifying process which is performed by the determination unit 740. The abnormality identifying process is a process of identifying a position which serves as a reason for an abnormality when an abnormality has occurred in generation of electric power in the fuel cell 100. The abnormality identifying process is periodically performed from a time point at which an ignition switch (not illustrated) disposed in a vehicle having the fuel cell system 10 mounted therein is turned on to a time point at which the ignition switch is turned off.

When the abnormality identifying process is started, the determination unit 740 determines whether an operating state of the fuel cell system 10 is an intermittent operating state (Step S110). Intermittent operation mentioned herein refers to an operating state in which the amount of electric power generated by the fuel cell 100 is controlled such that it reaches a preset amount of generated electric power by adjusting an amount of air to be supplied to the fuel cell 100, for example, at the time of low-load operation such as idling or low-speed traveling. The preset amount of generated electric power will be described later. In this embodiment, when the operating state of the fuel cell system 10 is the intermittent operating state, the opening control unit 710 outputs the opening control signals for switching the third valve 550 to a closed state and controlling the first valve 350 and the second valve 450 such that the amount of electric power generated by the fuel cell 100 reaches the preset amount of generated electric power. When the operating state of the fuel cell system 10 is the intermittent operating state, the rotation speed control unit 720 outputs the rotation speed control signal to the compressor 200 such that the compressor 200 rotates at a minimum rotation speed.

Figure 3:
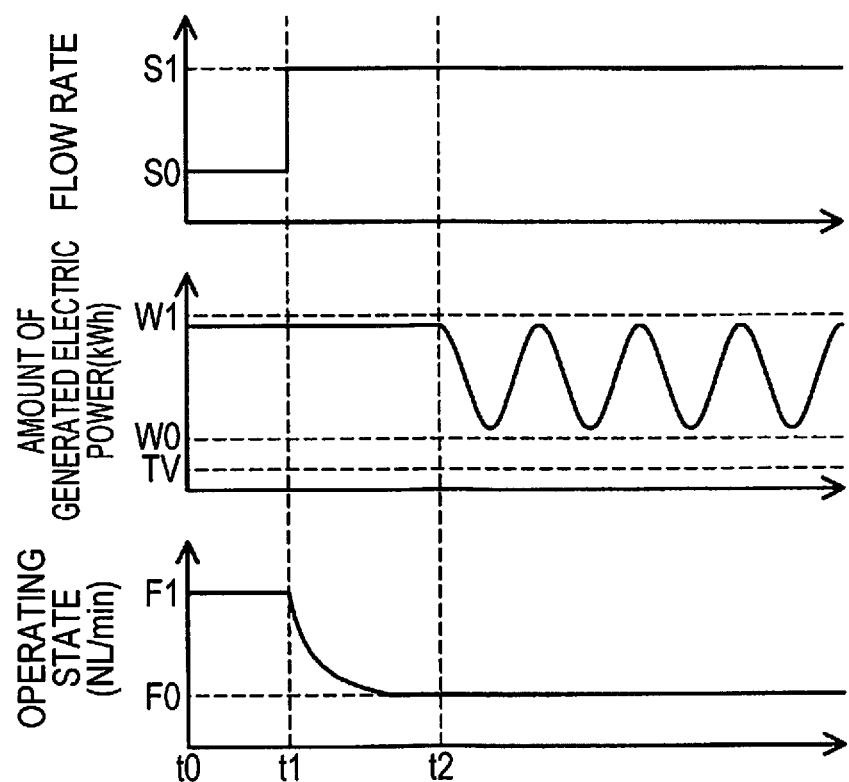
FIG. 3 is a diagram illustrating variation in an amount of generated electric power and variation in a flow rate of air.

FIG. 3 is a diagram illustrating variation in an amount of electric power generated by the fuel cell 100 and variation in a flow rate of air supplied from the compressor 200 when the fuel cell system 10 is switched from a normal operating state to the intermittent operating state. The normal operation mentioned herein refers to an operating state in which the amount of electric power generated by the fuel cell 100 is changed depending on electric power required for the fuel cell 100. FIG. 3 illustrates the variation in the amount of generated electric power and the variation in the flow rate of air supplied from the compressor 200 when an abnormality has not occurred in the fuel cell system 10. The horizontal axis of the graphs in FIG. 3 represents time. In FIG. 3, the upper graph indicates the operating state of the fuel cell system 10, the middle graph indicates the variation in the amount of electric power generated by the fuel cell 100, and the lower graph indicates the variation in the flow rate of air supplied from the compressor 200.

S0 in the vertical axis of the upper graph in FIG. 3 indicates that the operating state of the fuel cell system 10 is the normal operating state, and S1 indicates that the operating state of the fuel cell system 10 is the intermittent operating state.

From time t0 to time t1, the operating state of the fuel cell system 10 is the normal operating state. When the operating state of the fuel cell system 10 is switched from the normal operating state to the intermittent operating state at time t1, the rotation speed control unit 720 outputs the rotation speed control signal to the compressor 200 such that the compressor 200 operates at a minimum rotation speed. Accordingly, from time t1 to time t2, the flow rate of air supplied from the compressor 200 decreases from a flow rate F1 to a flow rate F0. At time t1, the opening control unit 710 outputs the opening control signals for switching the third valve 550 to the closed state and controlling the first valve 350 and the second valve 450 such that the amount of electric power generated by the fuel cell 100 reaches the preset amount of generated electric power.

After time t2, the amount of electric power generated by the fuel cell 100 is maintained in a constant range. The constant range mentioned herein refers to a range from an amount of generated electric power W0 to an amount of generated electric power W1. Adjustment of the amount of electric power generated by the fuel cell 100 at that time is embodied by adjusting the degrees of opening of the first valve 350 and the second valve 450. In this embodiment, the constant range corresponds to the preset amount of generated electric power. The preset amount of generated electric power is not limited to a constant range and may be a constant value.

Referring back to FIG. 2, when it is determined that the operating state of the fuel cell system 10 is not the intermittent operating state (NO in Step S110), the determination unit 740 ends the abnormality identifying process abnormality identifying process.

When it is determined that the operating state of the fuel cell system 10 is the intermittent operating state (YES in Step S110), the determination unit 740 determines whether the amount of electric power generated by the fuel cell 100 which is calculated by the generated electric power calculating unit 730 is less than a generated electric power threshold value which is set to be less than the preset amount of generated electric power (Step S120). In this embodiment, the generated electric power threshold value is a value TV which is less than the amount of generated electric power W0 which is a lower limit of the constant range described in the middle graph in FIG. 3. In this embodiment, when the amount of electric power generated by the fuel cell 100 is less than the value TV which is the generated electric power threshold value, it is determined that the amount of electric power generated by the fuel cell 100 is less than the generated electric power threshold value. In another embodiment, when an average value of the amounts of electric power generated by the fuel cell 100 in a certain time interval is less than the generated electric power threshold value, it may be determined that the amount of electric power generated by the fuel cell 100 is less than the generated electric power threshold value. The generated electric power threshold value may be an arbitrary value as long as it is a value with which it can be detected that the fuel cell 100 in the intermittent operating state cannot generate electric power by the preset amount of generated electric power.

When it is determined that the amount of electric power generated by the fuel cell 100 is equal to or greater than the generated electric power threshold value (NO in Step S120), the determination unit 740 ends the abnormality identifying process. At this time, since the fuel cell system 10 is controlled as instructed by the opening control signals and the rotation speed control signal, there is no abnormality in the fuel cell system 10.

When it is determined that the amount of electric power generated by the fuel cell 100 is less than the generated electric power threshold value (YES in Step S120), the determination unit 740 determines whether the value of the pressure measured by the pressure sensor 370 is equal to or greater than a preset pressure threshold value (Step S130). The case in which the amount of electric power generated by the fuel cell 100 is less than the generated electric power threshold value is, for example, a case in which the opening control unit 710 outputs the opening control signals for switching the third valve 550 to the closed state and controlling the first valve 350 and the second valve 450 such that the amount of electric power generated by the fuel cell 100 reaches the preset amount of generated electric power but the amount of electric power generated by the fuel cell 100 is less than the generated electric power threshold value. In this embodiment, a maximum value of a pressure range which is measurable when there is no abnormality in the fuel cell system 10 and the operating state of the fuel cell system 10 is the intermittent operating state is set as the pressure threshold value. The measurable pressure range is acquired by experiment in advance.

When it is determined that the value of the pressure measured by the pressure sensor 370 is equal to or greater than the pressure threshold value (YES in Step S130), the determination unit 740 determines that at least one of the first valve 350 and the second valve 450 is stuck closed (Step S135). Thereafter, the determination unit 740 ends the abnormality identifying process.

When it is determined that the value of the pressure measured by the pressure sensor 370 is less than the pressure threshold value (NO in Step S130), the determination unit 740 determines whether a value of the flow rate measured by the air flowmeter 670 is equal to or greater than a preset flow rate threshold value (Step S140).

The flow rate threshold value will be described now. The flow rate threshold value is a threshold value which is set for separating an abnormality in at least one of the supply flow passage 300 and the bypass flow passage 500 and an abnormality in the third valve 550 in the abnormality identifying process.

An event which is considered as an abnormality in at least one of the supply flow passage 300 and the bypass flow passage 500 is that a connection part between a plurality of pipes, which constitutes a part upstream from a position in the bypass flow passage 500 at which the third valve 550 is provided and the supply flow passage 300, is disconnected. Due to disconnection between the pipes, air supplied from the compressor 200 is not supplied to the fuel cell 100 but is discharged from the disconnected part to the atmosphere. This event is referred to as a first event.

On the other hand, an event which is considered as an abnormality in the third valve 550 is that the opening control unit 710 outputs the opening control signal for switching the third valve 550 to the closed state in the intermittent operating state but the third valve 550 is stuck open. Due to the third valve 550 being stuck open, air supplied from the compressor 200 is divided into air to be supplied to the fuel cell 100 and air to be discharged from the discharge flow passage 400 to the atmosphere via the bypass flow passage 500. This event is referred to as a second event.

In the first event, a distance from a position of the compressor 200 to a position at which the supplied air is discharged to the atmosphere is a distance from the position of the compressor 200 to a position at which a connection part between pipes is disconnected. On the other hand, in the second event, the distance from the position of the compressor 200 to the position at which the supplied air is discharged to the atmosphere is a distance from the position of the compressor 200 to a downstream end of the downstream flow passage 440. That is, the distance from the position of the compressor 200 to the position at which the supplied air is discharged to the atmosphere in the second event is longer than that in the first event. Accordingly, a pressure loss in the air supplied from the compressor 200 in the second event is greater than that in the first event. In the second event, the value of the flow rate measured by the air flowmeter 670 does not change in comparison with a case in which there is no abnormality in the fuel cell system 10. On the other hand, since the distance from the position of the compressor 200 to the position at which the supplied air is discharged to the atmosphere is shorter in the first event than in the second event, the pressure loss in the air supplied from the compressor 200 is small in the first event. Accordingly, in comparison with a case in which there is no abnormality in the fuel cell system 10, the value of the flow rate measured by the air flowmeter 670 increases.

Accordingly, a value which is greater than the maximum value of the flow rate which can be considered in the second event and is less than the minimum value of the flow rate which can be considered in the first event is set as the flow rate threshold value. For example, when the operating state of the fuel cell system 10 is the intermittent operating state and the first event or the second event occurs in the fuel cell system 10, the value of the flow rate measured by the air flowmeter 670 is experimentally acquired in advance and a value of the flow rate with which the first event and the second event can be separated out of the acquired values is set as the flow rate threshold value. When there are a plurality of connection parts, disconnection of a connection part which is most distant in the path in which air is supplied from the compressor 200 is set as the first event and the value of the flow rate thereof may be experimentally acquired.

Referring back to the abnormality identifying process illustrated in FIG. 2, when it is determined that the value of the flow rate measured by the air flowmeter 670 is equal to or greater than the flow rate threshold value (YES in Step S140), the determination unit 740 determines that pipe disconnection has occurred in the pipes constituting the supply flow passage 300 and the bypass flow passage 500 (Step S145). At this time, a driver of the vehicle in which the fuel cell system 10 is mounted may be notified that an abnormality has occurred or the fuel cell system 10 may be stopped. Thereafter, the determination unit 740 ends the abnormality identifying process.

When it is determined that the value of the flow rate measured by the air flowmeter 670 is less than the flow rate threshold value (NO in Step S140), the determination unit 740 determines that the third valve 550 is stuck open (Step S147). At this time, the driver may be notified similarly to the case in which Step S145 is performed. The opening control unit 710 may output the opening control signal such that the third valve 550 is repeatedly opened and closed to resolve the stuck state of the third valve 550. Thereafter, the determination unit 740 ends the abnormality identifying process.

According to the first embodiment, it is possible to separately identify being stuck open of the third valve 550 and pipe disconnection between pipes constituting the supply flow passage 300 and the bypass flow passage 500. Accordingly, it is possible to take an appropriate measure depending on the abnormality types.

In a fuel cell system in which being stuck open of the third valve and pipe disconnection between pipes constituting the supply flow passage and the bypass flow passage cannot be separately identified, there is concern that the third valve which is normal will malfunction by repeatedly opening and closing the third valve to resolve being stuck though the third valve is not stuck open. There is concern that pipes constituting the supply flow passage and the bypass flow passage will be erroneously replaced though there is no abnormality in the supply flow passage and the bypass flow passage. In the fuel cell system 10 according to the first embodiment, since being stuck open of the third valve 550 and pipe disconnection between pipes constituting the supply flow passage 300 and the bypass flow passage 500 can be separately identified, it is possible to reduce a likelihood that malfunction of the third valve 550 will be caused and a likelihood that pipes constituting the supply flow passage and the bypass flow passage will be erroneously replaced.

B. Second Embodiment

B1. Device Configuration

The configuration of a fuel cell system according to a second embodiment is the same as the configuration of the fuel cell system 10 according to the first embodiment. The fuel cell system according to the second embodiment performs an abnormality identifying process in the order which is different from that in the fuel cell system 10 according to the first embodiment.

B2. Abnormality Identifying Process

Figure 4:
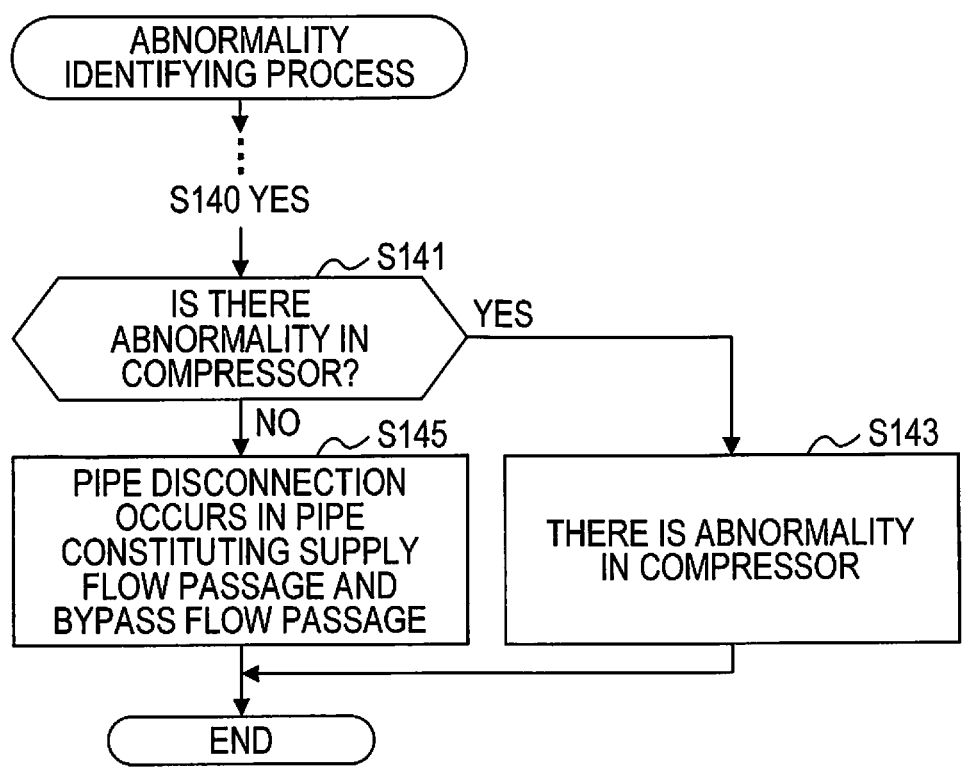
FIG. 4 is a flowchart illustrating an abnormality identifying process.

FIG. 4 is a flowchart illustrating the abnormality identifying process according to the second embodiment. The abnormality identifying process which is performed in the second embodiment is configured by inserting Step S141 between YES in Step S140 and Step S145 in the abnormality identifying process described with reference to FIG. 2. In FIG. 4, the same processes as in the abnormality identifying process illustrated in FIG. 2 will not be illustrated nor described except for Step S145.

When it is determined that the value of the flow rate measured by the air flowmeter 670 is equal to or greater than the flow rate threshold value (YES in Step S140), the determination unit 740 determines whether an abnormality has occurred in the compressor 200 (Step S141). Specifically, the determination unit 740 determines whether a difference between the rotation speed of the compressor 200 detected by the rotation speed sensor 270 and the rotation speed corresponding to the rotation speed control signal is equal to or greater than a preset rotation speed threshold value. The rotation speed corresponding to the rotation speed control signal is a rotation speed at which the normal compressor 200 having received the rotation speed control signal rotates. The rotation speed threshold value is a value with which an abnormality is considered to have occurred in the compressor 200 when the difference between the rotation speed detected by the rotation speed sensor 270 and the rotation speed corresponding to the rotation speed control signal is equal to or greater than the threshold value.

When it is determined that the difference in the rotation speed is equal to or greater than the rotation speed threshold value (YES in Step S141), the determination unit 740 determines that an abnormality has occurred in the compressor 200 (Step S143). Thereafter, the determination unit 740 ends the abnormality identifying process.

When it is determined that the difference in the rotation speed is less than the rotation speed threshold value (NO in Step S141), the determination unit 740 determines that pipe disconnection has occurred in the pipes constituting the supply flow passage 300 and the bypass flow passage 500 (Step S145). Thereafter, the determination unit 740 ends the abnormality identifying process.

According to the second embodiment, it is possible to separately identify being stuck open of the third valve 550, pipe disconnection between pipes constituting the supply flow passage 300 and the bypass flow passage 500, and an abnormality in the compressor 200. Accordingly, it is possible to take an appropriate measure depending on the abnormality types.

C. Third Embodiment

C1. Device Configuration

Figure 5:
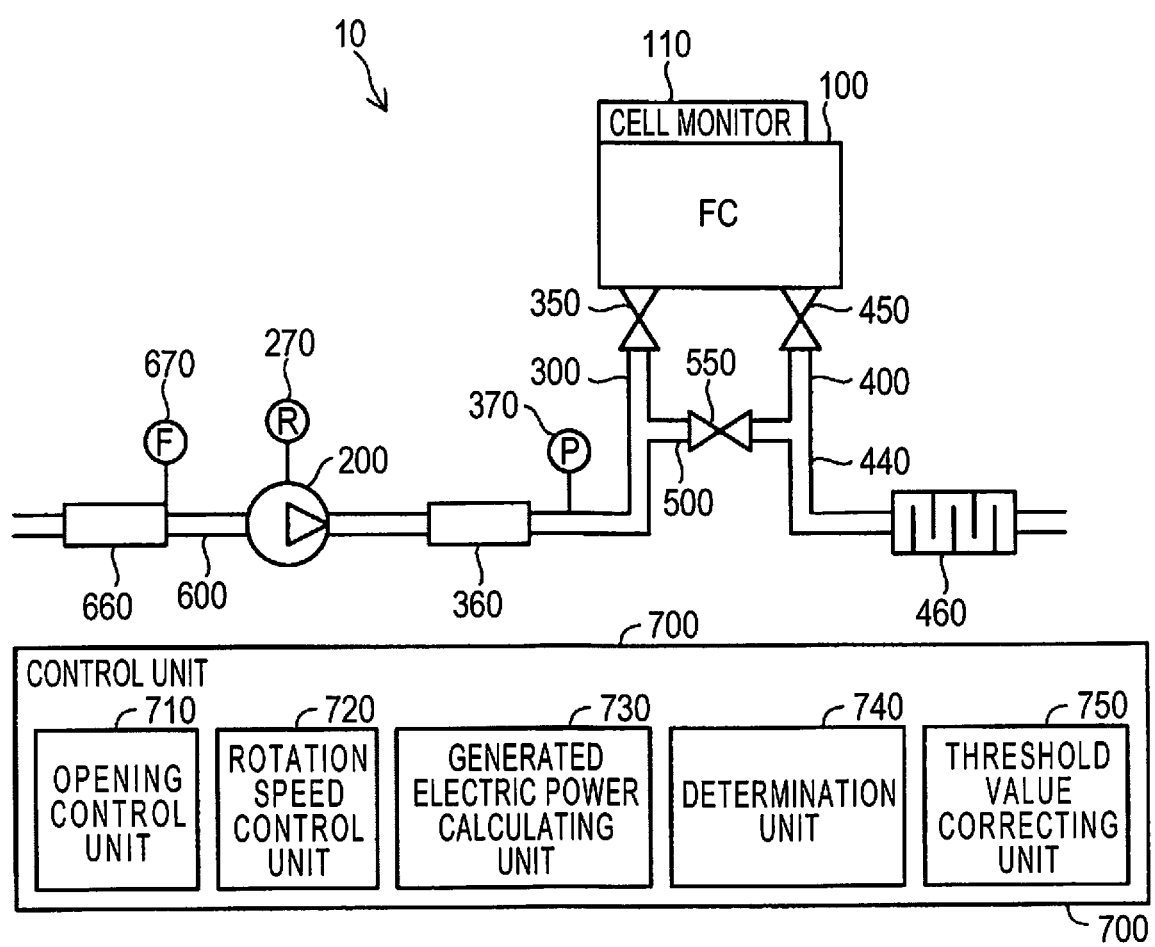
FIG. 5 is a diagram illustrating a configuration of a fuel cell system according to a third embodiment.

FIG. 5 is a diagram illustrating a configuration of a fuel cell system 10*a* according to a third embodiment. The fuel cell system 10*a* according to the third embodiment is different from the configuration of the fuel cell system 10 according to the first embodiment in that the control unit 700 includes a threshold value correcting unit 750.

The threshold value correcting unit 750 performs learning of the flow rate of the air measured by the air flowmeter 670 and corrects the flow rate threshold value based on the learning result while the fuel cell system 10*a* is operating. While the fuel cell system 10*a* is operating, the opening control signals output from the opening control unit 710 change depending on electric power required for the fuel cell 100 and thus the degrees of opening of the first valve 350, the second valve 450, and the third valve 550 change appropriately. Since a flow passage in which air supplied from the compressor 200 can flow changes depending on the degrees of opening of the first valve 350, the second valve 450, and the third valve 550, the threshold value correcting unit 750 performs learning of the flow rate of the air measured by the air flowmeter 670 for each degree of opening and uses the learning result to correct the flow rate threshold value. The threshold value correcting unit 750 may be configured, for example, to perform the learning and the correction for a predetermined period in response to an instruction from a repairer when at least some of components of the fuel cell system 10*a* are rearranged at the time of repair or may be configured to perform the learning and the correction at intervals of a preset time.

According to the third embodiment, even when a pressure loss in the flow passage through which air passes changes due to replacement, repair, and the like of a component of the fuel cell system 10*a*, it is possible to correct the flow rate threshold value to correspond to the change. Accordingly, it is possible to maintain accuracy for separately identifying abnormalities of the fuel cell system 10*a*.

D. Other Embodiments

In the first embodiment, an amount of air to be supplied to the fuel cell 100 is adjusted by the first valve 350 and the second valve 450, but the disclosure is not limited thereto. For example, in a fuel cell system including only one of the first valve 350 and the second valve 450, the amount of air to be supplied to the fuel cell 100 may be adjusted by the one valve.

In the first embodiment, the pressure sensor 370 is provided in the supply flow passage 300, but the disclosure is not limited thereto. For example, the pressure sensor 370 may be provided upstream from the position at which the third valve 550 is provided in the bypass flow passage 500.

In the first embodiment, the pressure threshold value is set to a maximum value of a pressure range which is measurable when there is no abnormality in the fuel cell system 10 and the operating state of the fuel cell system 10 is the intermittent operating state, but the disclosure is not limited thereto. For example, the pressure threshold value may be set to a value which is greater than the maximum value.

In the first embodiment, the abnormality identifying process includes a process of determining whether the operating state of the fuel cell system 10 is the intermittent operating state, but the disclosure is not limited thereto. For example, the abnormality identifying process may be a process obtained by removing Step S110 from the flowchart illustrated in FIG. 2. In this case, as the premise for performing the abnormality identifying process, the opening control unit 710 outputs the opening control signals for switching the third valve 550 to the closed state and controlling the first valve 350 and the second valve 450 such that the amount of electric power generated by the fuel cell 100 reaches the preset amount of generated electric power, and the rotation speed control unit 720 outputs the rotation speed control signal to the compressor 200 such that the compressor 200 rotates at the preset rotation speed. That is, as long as the premise can be satisfied, the abnormality identifying process may be performed at an arbitrary time. The preset rotation speed may be set to an arbitrary rotation speed between a minimum rotation speed and a maximum rotation speed of the compressor 200.

In the first embodiment, the value of the flow rate measured by the air flowmeter 670 is experimentally acquired in advance and the flow rate threshold value is set from the acquired values, but the disclosure is not limited thereto. For example, the flow rate threshold value may be set as follows. First, in consideration of the flow rate of air supplied from the compressor 200, a value of a pressure loss based on the distance from a position at which a connection part between pipes is disconnected to the compressor 200 and a value of a pressure loss based on a distance from a downstream end of the downstream flow passage 440 to the compressor 200 are calculated. Then, an estimated value of the flow rate measured by the air flowmeter 670 when the first event or the second event occurs in the fuel cell system 10 in the intermittent operating state is calculated from the calculated values of the pressure loss. Then, a value of a flow rate at which the first event and the second event can be separated based on the calculated estimated value may be set as the flow rate threshold value.

The disclosure is not limited to the above-mentioned embodiments, examples, and modified examples and can be embodied in various forms without departing from the gist of the disclosure. For example, technical features of the embodiments, examples, and modified examples corresponding to technical features of the aspects described in the SUMMARY can be appropriately exchanged or combined to solve a part or all of the above-mentioned problems or to achieve a part or all of the above-mentioned advantages. The technical features can be appropriately deleted as long as they are not described as being essential in this specification.

What is claimed is:

1. A fuel cell system comprising:
   a fuel cell that generates electric power using air;
   a compressor that compresses the air and supplies the compressed air to the fuel cell;
   a supply flow passage that is connected to the fuel cell and the compressor and in which the air compressed by the compressor flows towards the fuel cell;
   a discharge flow passage of which one end is connected to the fuel cell and in which the air discharged from the fuel cell flows towards an atmosphere;
   a bypass flow passage that branches from the supply flow passage and is connected to the discharge flow passage and in which the air flowing from a part connected to the discharge flow passage to a downstream flow passage which is downstream in the discharge flow passage flows;
a supply adjusting valve that is disposed in at least one position among a first position downstream from a first part connected to the bypass flow passage in the supply flow passage and a second position upstream from a second part connected to the bypass flow passage in the discharge flow passage and adjusts an amount of air to be supplied to the fuel cell;
a bypass valve that is disposed in the bypass flow passage and adjusts a flow rate of the air passing through the bypass flow passage;
a flow rate measuring unit that measures a flow rate of the air to be supplied from the compressor;
a pressure measuring unit that is disposed (a) upstream from a third position at which the bypass valve is disposed in the bypass flow passage or (b) in the supply flow passage and measures a pressure of the air compressed by the compressor;
an opening control unit configured to output an opening control signal for controlling degrees of opening of the supply adjusting valve and the bypass valve;
a rotation speed control unit configured to output a rotation speed control signal for controlling a rotation speed of the compressor;
a generated electric power calculating unit configured to calculate an amount of electric power generated by the fuel cell; and
a determination unit configured to determine whether there is an abnormality in the fuel cell system,
wherein the determination unit is programmed to
 (a) determine that the bypass valve is stuck open when the measured flow rate is less than a preset flow rate threshold value, and
 (b) determine that pipe disconnection has occurred in a pipe constituting the supply flow passage and the bypass flow passage when the measured flow rate is equal to or greater than the flow rate threshold value,
when (I) the determination unit (i) causes the opening control unit to output the opening control signal for switching the bypass valve to a closed state and controlling the supply adjusting valve such that the amount of generated electric power reaches a preset amount of generated electric power, and (ii) causes the rotation speed control unit to output the rotation speed control signal such that the compressor rotates at a preset rotation speed, and (II) the calculated amount of generated electric power is less than a generated electric power threshold value which is set to be less than the preset amount of generated electric power and the measured pressure is less than a preset pressure threshold value.

2. The fuel cell system according to claim 1, wherein the determination unit is programmed to determine that the supply adjusting valve is stuck closed when the calculated amount of generated electric power is less than the generated electric power threshold value which is set to be less than the preset amount of generated electric power and the measured pressure is equal to or greater than the pressure threshold value.

3. The fuel cell system according to claim 1, further comprising a threshold value correcting unit programmed to learn the flow rate measured by the flow rate measuring unit which varies depending on the opening control signal while the fuel cell system is operating and to correct the flow rate threshold value based on a result of learning of the measured flow rate.

4. A fuel cell system comprising:
a fuel cell that generates electric power using air;
a compressor that compresses the air and supplies the compressed air to the fuel cell;
a rotation speed sensor that detects a rotation speed of the compressor;
a supply flow passage that is connected to the fuel cell and the compressor and in which the air compressed by the compressor flows towards the fuel cell;
a discharge flow passage of which one end is connected to the fuel cell and in which the air discharged from the fuel cell and flows towards an atmosphere;
a bypass flow passage that branches from the supply flow passage and is connected to the discharge flow passage and supplies the air from a part connected to the discharge flow passage to a downstream flow passage which is downstream in the discharge flow passage;
a supply adjusting valve that is disposed in at least one position among a first position downstream from a first part connected to the bypass flow passage in the supply flow passage and a second position upstream from a second part connected to the bypass flow passage in the discharge flow passage and adjusts an amount of air to be supplied to the fuel cell;
a bypass valve that is disposed in the bypass flow passage and adjusts a flow rate of the air passing through the bypass flow passage;
a flow rate measuring unit that measures a flow rate of the air to be supplied from the compressor;
a pressure measuring unit that is disposed (a) upstream from a third position at which the bypass valve is disposed in the bypass flow passage or (b) in the supply flow passage and measures a pressure of the air compressed by the compressor;
an opening control unit configured to output an opening control signal for controlling degrees of opening of the supply adjusting valve and the bypass valve;
a rotation speed control unit configured to output a rotation speed control signal for controlling the rotation speed of the compressor;
a generated electric power calculating unit configured to calculate an amount of electric power generated by the fuel cell; and
a determination unit configured to determine whether there is an abnormality in the fuel cell system,
wherein the determination unit is programmed to
 (a) determine that the bypass valve is stuck open when the measured flow rate is less than a preset flow rate threshold value,
 (b) determine whether there is an abnormality in the compressor when the measured flow rate is equal to or greater than the flow rate threshold value,
 (c) determine that there is the abnormality in the compressor when a difference between the detected rotation speed and the rotation speed corresponding to the rotation speed control signal is equal to or greater than a preset rotation speed threshold value in determining whether there is the abnormality in the fuel cell system, and
 (d) determine that pipe disconnection has occurred in a pipe constituting the supply flow passage and the bypass flow passage when the difference between the detected rotation speed and the rotation speed corresponding to the rotation speed control signal is less than the preset rotation speed threshold value in determining whether there is the abnormality in the fuel cell system, when (I) the determination unit (i) causes the opening control unit to output the opening control signal for switching the bypass valve to a closed state and controlling the supply adjusting valve such that the amount of generated electric power reaches a preset amount of generated electric power, and (ii) causes the rotation speed control unit to output the rotation speed control signal such that the compressor rotates at a preset rotation speed, and (II) the calculated amount of generated electric power is less than a generated electric power threshold value which is set to be less than the preset amount of generated electric power and the measured pressure is less than a preset pressure threshold value.

5. The fuel cell system according to claim 4, wherein the determination unit is programmed to determine that the supply adjusting valve is stuck closed when the calculated amount of generated electric power is less than the generated electric power threshold value which is set to be less than the preset amount of generated electric power and the measured pressure is equal to or greater than the pressure threshold value.

6. The fuel cell system according to claim 4, further comprising a threshold value correcting unit programmed to learn the flow rate measured by the flow rate measuring unit which varies depending on the opening control signal while the fuel cell system is operating and to correct the flow rate threshold value based on a result of learning of the measured flow rate.

* * * * *